(12) United States Patent
Kim et al.

(10) Patent No.: US 12,266,319 B2
(45) Date of Patent: Apr. 1, 2025

(54) DISPLAY APPARATUS AND CONTROL METHOD THEREOF

(71) Applicant: SAMSUNG ELECTRONICS CO., LTD., Suwon-si (KR)

(72) Inventors: Doyoung Kim, Suwon-si (KR); Battushig Ganbold, Suwon-si (KR); Seungik Kim, Suwon-si (KR); Heehyo Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/384,276

(22) Filed: Oct. 26, 2023

(65) Prior Publication Data

US 2024/0054966 A1     Feb. 15, 2024

Related U.S. Application Data

(63) Continuation of application No. PCT/KR2022/005994, filed on Apr. 27, 2022.

(30) Foreign Application Priority Data

Jun. 14, 2021  (KR) .................. 10-2021-0076964

(51) Int. Cl.
G09G 3/36      (2006.01)
G06F 3/14      (2006.01)
G09G 3/34      (2006.01)

(52) U.S. Cl.
CPC .............. *G09G 3/36* (2013.01); *G06F 3/14* (2013.01); *G09G 3/3406* (2013.01);
(Continued)

(58) Field of Classification Search
CPC .......... G09G 3/36; G09G 3/3406; G09G 5/10; G09G 1/167; G09G 1/266;
(Continued)

(56) References Cited

U.S. PATENT DOCUMENTS 9,552,754 B2   1/2017  Min et al.
10,359,824 B2  7/2019  Seo
(Continued)

FOREIGN PATENT DOCUMENTS

CN    112119560 A    12/2020
JP    2018-29028 A    2/2018
(Continued)

OTHER PUBLICATIONS

International Search Report (PCT/ISA/210) dated Aug. 5, 2022, issued by International Searching Authority for International Application No. PCT/KR2022/005994.
(Continued)

*Primary Examiner* — Stephen G Sherman
(74) *Attorney, Agent, or Firm* — Sughrue Mion, PLLC

(57) ABSTRACT

A display apparatus includes: an external input port which is connectable with an external apparatus; a power supply; a display; and at least one processor configured to: obtain first power consumed in the display based on brightness information of the display, determine second power suppliable to the external input port based on the first power consumed and supply power of the power supply, receive information about third power that is configured to supply power to an external apparatus connected to the external input port from the external apparatus, determine fourth power supplied to the external input port based on the second power and the information about the third power, determine an over current protection (OCP) value based on the fourth power, and stop power supply to the external apparatus based on a current value supplied to the external input port exceeding the OCP value.

18 Claims, 12 Drawing Sheets

(52) U.S. Cl.
CPC ............... *G09G 2320/0626* (2013.01); *G09G 2330/021* (2013.01); *G09G 2330/04* (2013.01); *G09G 2354/00* (2013.01); *G09G 2360/145* (2013.01)

(58) Field of Classification Search
CPC ..... G09G 2320/0626; G09G 2330/021; G09G 2330/04; G09G 2330/02; G09G 2330/025; G09G 2354/00; G09G 2360/144; G09G 2360/145; G09G 2370/22; G06F 1/28; G06F 1/266; G06F 3/14; G06F 3/1423; H04N 5/63; H04N 5/58
See application file for complete search history.

(56) References Cited

U.S. PATENT DOCUMENTS

| | | | |
|---|---|---|---|
| 11,460,900 B2 | 10/2022 | Nagano | |
| 2013/0147855 A1* | 6/2013 | Wang | G09G 3/20 345/690 |
| 2017/0358947 A1* | 12/2017 | Waters | H02J 13/00 |
| 2019/0250692 A1 | 8/2019 | Kang | |
| 2020/0236242 A1 | 7/2020 | Kwak et al. | |
| 2023/0206868 A1 | 6/2023 | Kim et al. | |

FOREIGN PATENT DOCUMENTS

| | | |
|---|---|---|
| KR | 20-0211353 Y1 | 2/2001 |
| KR | 10-1601274 B1 | 3/2016 |
| KR | 10-2017-0009279 A | 1/2017 |
| KR | 10-2017-0073750 A | 6/2017 |
| KR | 10-2019-0005643 A | 1/2019 |
| KR | 10-2019-0097485 A | 8/2019 |
| KR | 10-2047059 B1 | 11/2019 |
| KR | 10-2022-0040095 A | 3/2022 |
| WO | 2019/176003 A1 | 9/2019 |

OTHER PUBLICATIONS

Written Opinion (PCT/ISA/237) dated Aug. 5, 2022, issued by International Searching Authority for International Application No. PCT/KR2022/005994.

* cited by examiner

FIG. 9

| PD[W] | CHARGE VOLTAGE [V] | CHARGE CURRENT [A] | OCP Margin[A] (+20%) | POWER CONSUMPTION STRENGTH [W] | OCP SETTING CONSIDERING 100W OUTPUT [A] | POWER CONSUMPTION STRENGTH CONSIDERING OCP [W] |
|---|---|---|---|---|---|---|
| 45 | 15 | 3 | 3.6 | 54 | 3.6 | 54 |
| 65 | 20 | 3.25 | 3.9 | 78 | 3.9 | 78 |
| 70 | 20 | 3.5 | 4.2 | 84 | 4.2 | 84 |
| 80 | 20 | 4 | 4.8 | 96 | 4.8 | 96 |
| 90 | 20 | 4.5 | 5.4 | 108 | 4.85 | 97 |

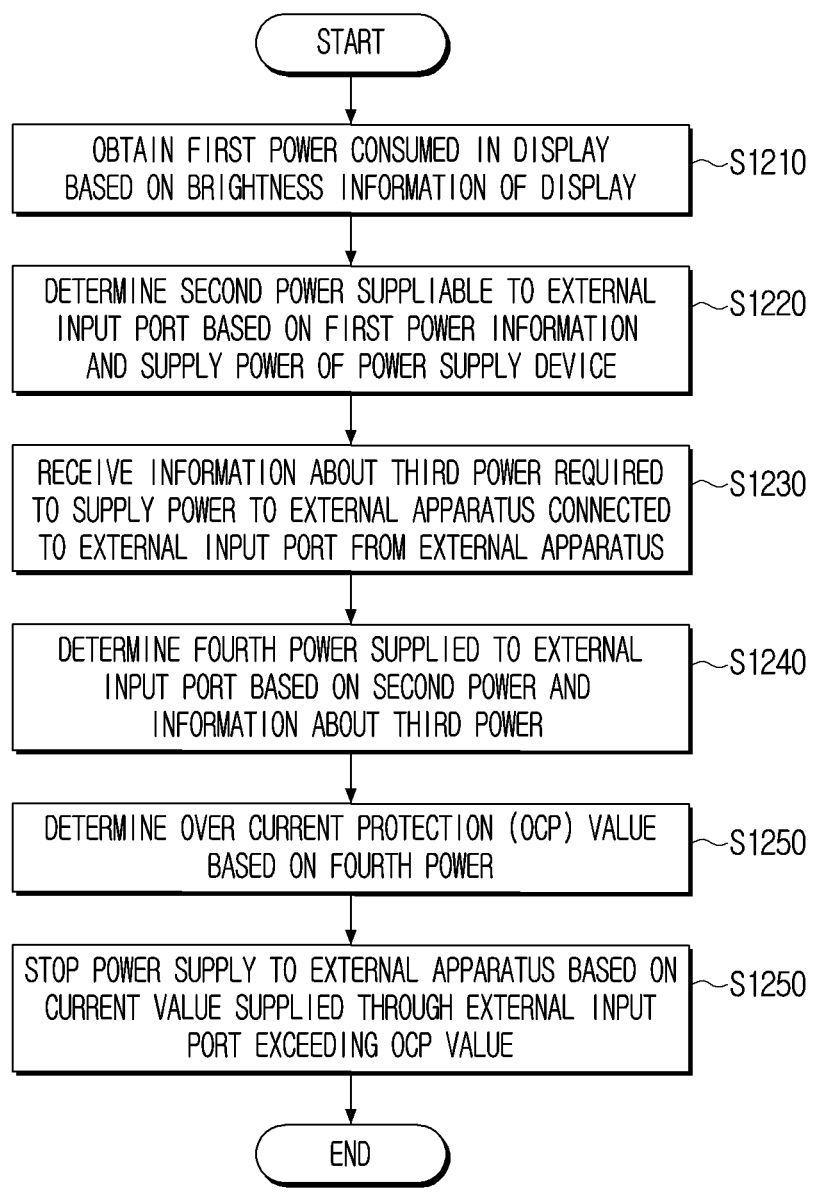

DISPLAY APPARATUS AND CONTROL METHOD THEREOF

CROSS REFERENCE TO RELATED APPLICATIONS

This application is a by-pass continuation application of International Application No. PCT/KR2022/005994, filed on Apr. 27, 2022, which is based on and claims priority to Korean Patent Application Numbers 10-2021-0076964, filed on Jun. 14, 2021, in the Korean Intellectual Property Office, the disclosures of which are incorporated by reference herein in their entireties. The disclosed embodiments relates to a display apparatus including a backlight unit.

TECHNICAL FIELD

The disclosed embodiments relate to a display apparatus and a control method thereof, and more particularly to a display apparatus capable of supplying charging power to an external apparatus through an external input port and a control method thereof.

BACKGROUND ART

Recently, with more external apparatuses supporting fast charging, demands by users for fast charging are also consistently increasing.

Conventional display apparatuses have been able to supply power to an external apparatus through an external input port having a USB standard. However, because conventional display apparatuses are only able to supply constant power regardless of power consumption by an apparatus, there has been a problem of not being able to supply sufficient power to the external apparatus other than a method of increasing volume of a power supply device.

SUMMARY

The disclosed embodiments addresses the above-described problem, and an object of the disclosure is to provide a display apparatus capable of supplying sufficient power to an external apparatus without increasing capacity of a power supply device by adjusting the power being supplied to the external apparatus according to power consumption of the display apparatus and a control method thereof.

In addition, to prevent excessive current from being provided to the external apparatus and damaging the apparatus, a display apparatus that adjusts an over current protection (OCP) value according to supply power and a control method thereof are provided.

A display apparatus may include: an external input port which is connectable with an external apparatus, the external input port being configured to supply power to the external apparatus; a power supply configured to (i) generate direct current power corresponding to a power consumption of the external apparatus when using power received from an external source, and (ii) provide the generated direct current power to the external input port; a display; and at least one processor configured to: obtain first power consumed in the display based on brightness information of the display, determine second power suppliable to the external input port based on the first power consumed and supply power of the power supply, receive information about third power that is configured to supply power to an external apparatus connected to the external input port from the external apparatus, determine fourth power supplied to the external input port based on the second power and the information about the third power, determine an over current protection (OCP) value based on the fourth power, and stop power supply to the external apparatus based on a current value supplied to the external input port exceeding the OCP value.

The at least one processor may be further configured to determine the OCP value according to a pre-set ratio from the current value supplied to the external input port according to the fourth power.

The at least one processor may be further configured to adjust, based on power calculated based on the OCP value and a voltage value according to the fourth power exceeding supply power of the power supply, the OCP value to be reduced.

The at least one processor may be further configured to receive the information about the third power with a USB Power Delivery (USB-PD) Power Data Objects (PDO) method.

The information about the third power may be information about a voltage value and a current value required to charge the external apparatus. The at least one processor may be further configured to determine, based on the supplied power of the external apparatus calculated based on the voltage value and the current value corresponding to the information about the third power not exceeding the second power, the fourth power based on the voltage value and the current value corresponding to the information about the third power.

The information about the third power may be information about a voltage value and a current value required to charge the external apparatus. The at least one processor may be further configured to determine, based on the supplied power of the external apparatus calculated based on the voltage value and the current value corresponding to the information about the third power exceeding the second power, the fourth power with a pre-set voltage value and current value within a range not exceeding the second power.

The display apparatus may further include an illuminance sensor. The at least one processor may be further configured to receive a sensed illuminance surrounding the display apparatus from the illuminance sensor, adjust brightness of the display based on the sensed illuminance, and obtain the adjusted brightness information as brightness information of the display.

The at least one processor may be further configured to obtain, based on a user command for adjusting brightness of the display being input, the adjusted brightness information as brightness information of the display.

The external input port may be a USB Type-C standard.

The at least one processor may be further configured to: receive an image signal from the external input port, and control the display to display an image based on the received image signal.

A control method of a display apparatus may include: obtaining first power consumed in a display based on brightness information of the display; determining second power suppliable to an external input port based on the first power consumed and supply power of a power supply; receiving information about third power that is configured to supply power to an external apparatus connected to the external input port from the external apparatus; determining fourth power supplied to the external input port based on the second power and information about the third power; determining an over current protection (OCP) value based on the fourth power; and stopping power supply to the external apparatus based on a current value supplied through the external input port exceeding the OCP value.

The determining the OCP value may include determining the OCP value according to a pre-set ratio from the current value supplied to the external input port according to the fourth power.

The method may further include: adjusting, based on power calculated based on the OCP value and a voltage value according to the fourth power exceeding supply power of the power supply, the OCP value to be reduced.

The receiving information about the third power may include receiving the information about the third power with a USB Power Delivery (USB-PD) Power Data Objects (PDO) method.

The information about the third power may include information about a voltage value and a current value required to charge the external apparatus. The determining the fourth power may include determining, based on the supplied power of the external apparatus calculated based on the voltage value and the current value corresponding to the information about the third power not exceeding the second power, the fourth power based on the voltage value and the current value corresponding to the information about the third power.

The information about the third power may be information about a voltage value and a current value required to charge the external apparatus. The determining the fourth power may include determining, based on the supplied power of the external apparatus calculated based on the voltage value and the current value corresponding to the information about the third power exceeding the second power, the fourth power with a pre-set voltage value and current value within a range not exceeding the second power.

The method may further include: receiving a sensed illuminance surrounding the display apparatus from the illuminance sensor, adjusting brightness of the display based on the sensed illuminance, and obtaining the adjusted brightness information as brightness information of the display.

The method may further include: obtaining, based on a user command for adjusting brightness of the display being input, the adjusted brightness information as brightness information of the display.

The method may further include: receiving an image signal from the external input port, and controlling the display to display an image based on the received image signal.

A non-transitory computer readable medium may store instructions that when executed by at least one processor directs the at least one processor to perform a control method of a display apparatus. The control method may include: obtaining first power consumed in a display based on brightness information of the display; determining second power suppliable to an external input port based on the first power consumed and supply power of a power supply; receiving information about third power that is configured to supply power to an external apparatus connected to the external input port from the external apparatus; determining fourth power supplied to the external input port based on the second power and information about the third power; determining an over current protection (OCP) value based on the fourth power; and stopping power supply to the external apparatus based on a current value supplied through the external input port exceeding the OCP value.

BRIEF DESCRIPTION OF THE DRAWINGS

FIG. 9 is a diagram illustrating an operation of determining an OCP value according to power supplied from a display apparatus to an external apparatus according to one or more embodiments of the disclosure;

FIG. 12 is a flowchart illustrating a control method of a display apparatus according to one or more embodiments of the disclosure.

DETAILED DESCRIPTION

Figure 1:
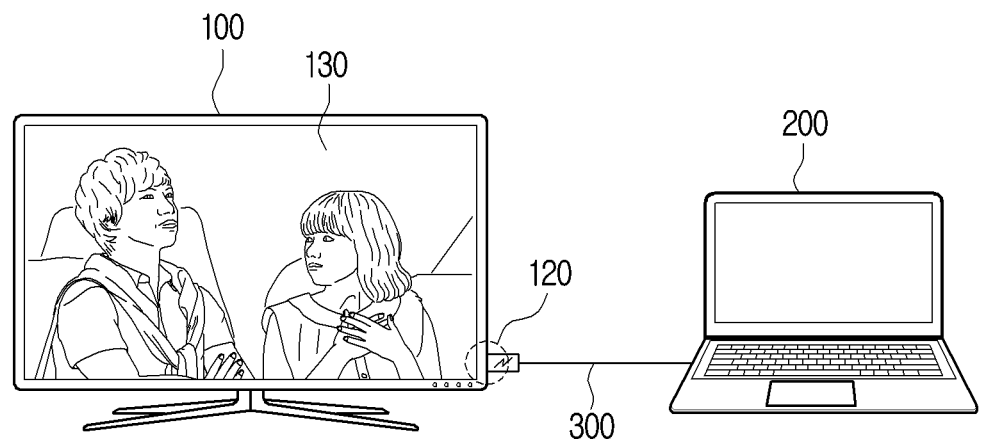
FIG. 1 is a diagram illustrating a display apparatus and an external apparatus according to one or more embodiments of the disclosure.

One or more embodiments described below are provided as examples to assist in understanding of the disclosed embodiments, and it is to be understood that the disclosed embodiments may be variously modified and realized, unlike the one or more embodiments described herein. However, in describing the disclosed embodiments, in case it is determined that the detailed description of related known technologies may unnecessarily confuse the gist of the disclosed embodiments, the detailed description thereof and the detailed drawing thereof will be omitted. In addition, the accompanied drawing may be shown exaggerated in measurement of some elements rather than being shown according to its actual scale to assist in the understanding of the disclosed embodiments.

Terms used in describing one or more embodiments of the disclosed embodiments are general terms selected considering their function herein. However, the terms may change depending on, for example, intention, legal or technical interpretation, and/or emergence of new technologies of those skilled in the related art. Further, in certain cases, there may be terms arbitrarily selected. The terms described above may be interpreted according to the meaning defined in the disclosed embodiments, and if no specific definition is described, the meaning of the term may be interpreted based on the overall context of the disclosed embodiments and technical sense common in the corresponding technical field.

In describing the disclosed embodiments, the order of each step is to be understood as non-limiting unless the order of each step needs to be performed such that a preceding step must be performed logically and temporally prior to a following step. That is, except for exceptional cases as described above, even if a process described as the following step is performed preceding a process described as the preceding step, it does not influence the nature of the disclosed embodiments and the scope of protection should also be defined regardless of the order of the step.

As used herein, expressions such as "have," "may have," "include," "may include," or the like are used to designate a presence of a corresponding characteristic (e.g., elements such as numerical value, function, operation, or component), and not to preclude a presence or a possibility of additional characteristics.

The expressions such as "first," and "second" may be used to refer to various elements, but the elements are not to be limited to the terms. The terms may only be used to distinguish one element from another. For example, a first element may be denoted as a second element, and similarly a second element may also be denoted as a first element without departing from the scope of the disclosed embodiments.

Further, because elements in each embodiment are described, the disclosed embodiments is not necessarily limited thereto. Accordingly, some elements may be modified or omitted, and other elements may be added. In addition, the elements may be distributed and disposed in independent apparatus different from one another.

Furthermore, although one or more embodiments have been described in detail with reference to the accompanying drawings and descriptions described in the accompanying drawings, the disclosed embodiments are not limited to the embodiments described herein.

The disclosed embodiments will be described in detail below with reference to the accompanied drawings.

FIG. 1 is a diagram illustrating a display apparatus and an external apparatus according to one or more embodiments of the disclosure.

A display apparatus 100 may refer to an electronic apparatus including a display. Specifically, the display apparatus 100 may be realized as not only a television (TV), a monitor, a laptop personal computer (PC), a mobile phone, a personal digital assistance (PDA), a kiosk, or a video wall, but also as home appliances of various types such as, for example, and without limitation, a refrigerator, a washer, and/or an air conditioner which includes a display 130.

The display apparatus 100 may receive content of various types such as, for example, and without limitation, game content, movie content, home-shopping content, drama content, and/or VR content and display through the display 130.

In addition, the display apparatus 100 may include an external input port 120 with which connecting with an external apparatus via wired means is possible.

An external apparatus 200 may refer to an electronic apparatus connectable with the display apparatus 100 via wired means. The external apparatus 200 may be realized as a laptop PC, but is not limited thereto, and may be realized in various devices such as a device which can receive a supply of power through a wired connection, for example, and without limitation, a tablet PC, a mobile telephone, a video telephone, a smartphone, a netbook computer, a workstation, a PDA, a portable multimedia player (PMP), an MP3 player, a camera, a virtual reality (VR) implementation apparatus, and/or a wearable device.

The display apparatus 100 may be connected with the external apparatus 200 through the external input port 120 which is provided at one side of the apparatus and transmit and receive information with the external apparatus 200, or supply power to the external apparatus 200.

If a maximum value of power which can be supplied to the external apparatus 200 is fixed regardless of power consumption of the display apparatus 100, because only limited power can be transferred to the external apparatus 200 despite there being surplus of supply power such as when consumption power of the display apparatus 100 is small (e.g., when in an energy saving mode or when operating at a low brightness), there has been a problem of charging power supply being inefficient.

Accordingly, provided is a display apparatus capable of supplying sufficient power to an external apparatus without increasing capacity of a power supply device by adjusting the power supplied to the external apparatus according to power consumption of the display apparatus and a control method thereof. Various embodiments will be described below.

Figure 2:
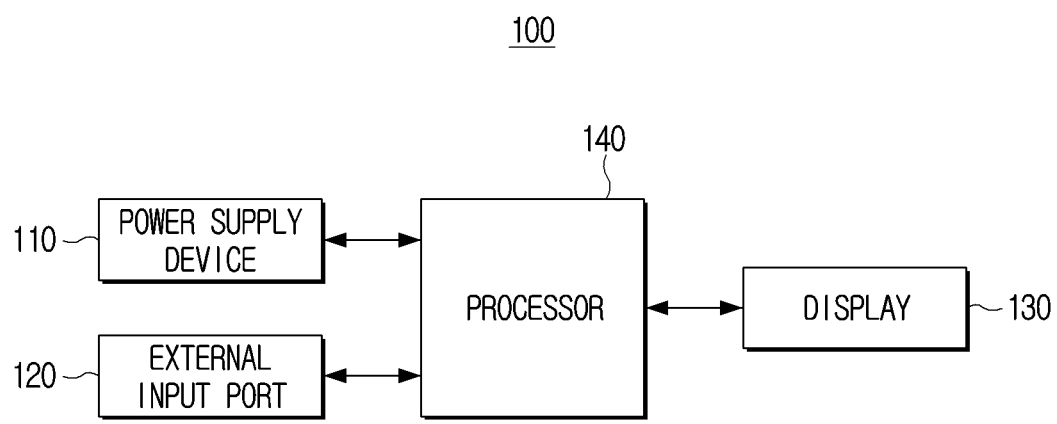
FIG. 2 is a block diagram illustrating a configuration of a display apparatus according to one or more embodiments of the disclosure.

FIG. 2 is a block diagram illustrating a configuration of a display apparatus according to one or more embodiments of the disclosure.

Referring to FIG. 2, the display apparatus 100 may include a power supply device 110, the external input port 120, the display 130, and a processor 140.

The power supply device 110 may supply power to various configurations of the display apparatus 100 using the power received from the outside. In addition, if the external apparatus 200 is connected to the external input port 120 of the display apparatus 100, the power supply device 110 may generate direct current power corresponding to the external apparatus, and supply power to the external apparatus 200 by providing the generated direct current power to the external input port 120.

The power supply device 110 is not limited to a specific device, but the power supply device 110 will be described assuming that it is a switching mode power supply (SMPS). The SMPS may refer to a power supply device by a switching operation, and may be a power supply device having an advantage of sizes and weights of energy accumulating components being minimized due to tens and hundreds of kHz switching frequencies.

The SMPS provided in the display apparatus 100 may be fixed with its own power capacity, and a problem in an operation of the display apparatus 100 may occur when a power demand that exceeds the power capacity occurs. Accordingly, a sum of power consumption consumed by the display apparatus 100 and power supplied to the external apparatus 200 through the external input port 120 may not exceed the power capacity of the SMPS.

The external input port 120 may be a port with which the display apparatus 100 and the external apparatus 200 can be connected via wired means.

The external input port 120 may be a port having any one standard from among a high definition multimedia interface (HDMI), a mobile high-definition link (MHL), a universal serial bus (USB), a display port (DP), a Thunderbolt, a video graphics array (VGA) port, a RGB port, a D-subminiature (D-SUB), and a digital visual interface (DVI).

Specifically, the external input port 120 may be a USB Type-C standard. The USB Type-C may be a 24-pin USB terminal system that allows transmission of data and power. The USB Type-C may be used in a USB-PD standard, and may be a terminal system that is convenient for fast charging, and has a high usability due to there being no vertical differentiation.

The display apparatus 100 may perform communication with the external apparatus 200 through the external input port 120, and simultaneously provide power to the external apparatus 200. Specifically, the display apparatus 100 may display an image through the display 130 by receiving an image signal from the external apparatus 200 through the external input port 120, and simultaneously provide a charging power source by supplying power to the external apparatus 200 through the external input port 120.

The display apparatus 100 may be connected with the external apparatus 200 through a cable 300. Referring to FIG. 1, one side of the cable 300 may be connected to the external input port 120, and an opposite side thereof may be connected to the external apparatus 200, and the display apparatus 100 may transmit and receive an input and output signal through the cable 300 while simultaneously supplying power to the external apparatus 200.

The display 130 may be an apparatus that outputs information in visual form (e.g., text, image). The display 130 may display an image corresponding to the image signal received from the external apparatus 200.

The display 130 may be implemented as a display of various forms such as, for example, and without limitation, a liquid crystal display (LCD), an organic light emitting diode (OLED) display, a quantum dot light-emitting diode (QLED) display, and/or a plasma display panel (PDP). In the display 130, a driving circuit, which may be implemented in the form of a thin film transistor (TFT), a low temperature poly silicon (LTPS) TFT, an organic TFT (OTFT), and/or a backlight unit may be included. The display 130 may be implemented as, for example, a touch screen coupled with a touch sensor, a flexible display, and/or a three-dimensional display (3D display).

The processor 140 may control the overall operation of the display apparatus 100.

Specifically, the processor 140 may be connected with each configuration of the display apparatus 100 and control an operation of the display apparatus 100. For example, the processor 140 may control an operation of the display apparatus 100 by being connected with the power supply device 110, the external input port 120, and the display 130.

The processor 140 may be designated to various designations such as, for example, and without limitation, a digital signal processor (DSP), a microprocessor, a central processing unit (CPU), a micro controller unit (MCU), a micro processing unit (MPU), a neural processing unit (NPU), a controller, and/or an application processor (AP), but is described as the processor 140. The processor 140 may be implemented as a system on chip (SoC), or a large scale integration (LSI), or may be implemented in a form of a field programmable gate array (FPGA). In addition, the processor 140 may include a volatile memory such as a SRAM.

The processor 140 may obtain first power consumed in the display 130 based on brightness information of the display 130, determine second power suppliable to the external input port 120 based on first power information and supply power of the power supply device 110, receive information about third power required to provide power to the external apparatus 200 connected to the external input port 120 from the external apparatus 200, and determine fourth power which is provided to the external input port 120 based on the second power and information about the third power.

In addition, the processor 140 may determine an over current protection (OCP) value based on the fourth power, and stop power supply to the external apparatus 200 if a current value supplied to the external input port 120 exceeds the OCP value.

Figure 3:
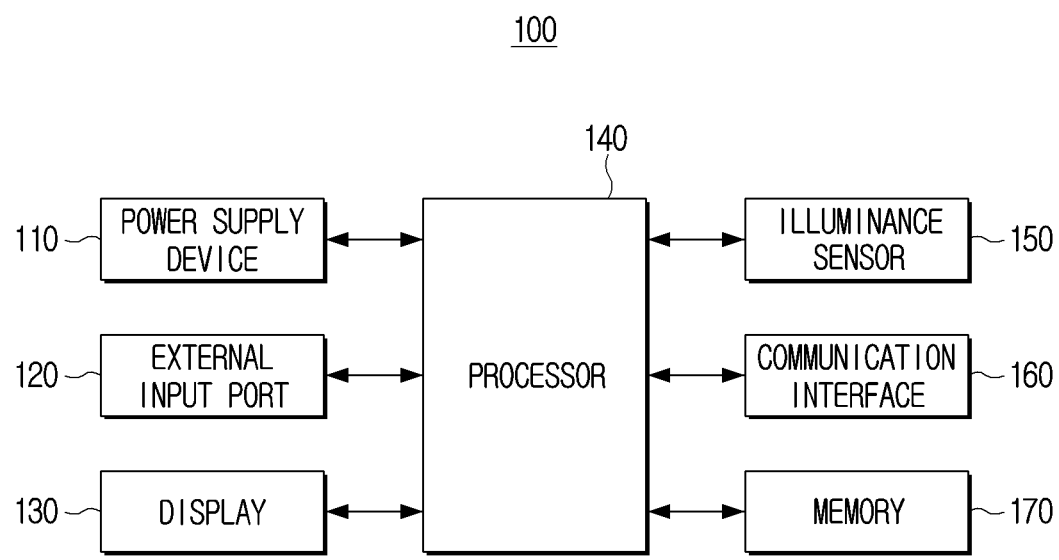
FIG. 3 is a block diagram illustrating a detailed configuration of a display apparatus according to one or more embodiments of the disclosure.

FIG. 3 is a block diagram illustrating a detailed configuration of a display apparatus according to one or more embodiments of the disclosure.

Referring to FIG. 3, the display apparatus 100 may include the power supply device 110, the external input port 120, the display 130, the processor 140, an illuminance sensor 150, a communication interface 160, and a memory 170. Detailed descriptions on parts that overlap with the configurations shown in FIG. 2 from among the configurations shown in FIG. 3 will be omitted.

The illuminance sensor 150 may sense illuminance at a surrounding of the display apparatus 100. The processor 140 may adjust a brightness of the display 130 based on the illuminance sensed from the illuminance sensor 150, and obtain the first power consumed in the display apparatus 100 by obtaining the adjusted brightness information as brightness information of the display 130. Detailed descriptions on a brightness adjustment operation of the display 130 through the illuminance sensor 150 will be described below in FIG. 11.

The communication interface 160 may transmit and receive various information by performing communication with the external apparatus. The communication interface 160 may not only perform communication with the external apparatus through a local area network (LAN), an internet network, and a mobile communication network, but also perform communication with the external apparatus through various communication methods such as, for example, and without limitation, Bluetooth (BT), Bluetooth Low Energy (BLE), Wireless Fidelity (WI-FI), Wireless Fidelity Direct (WI-FI Direct), ZigBee, and/or NFC.

The memory 170 may be stored with various instructions, programs, or data necessary in an operation of the display apparatus 100 or the processor 140.

Figure 4:
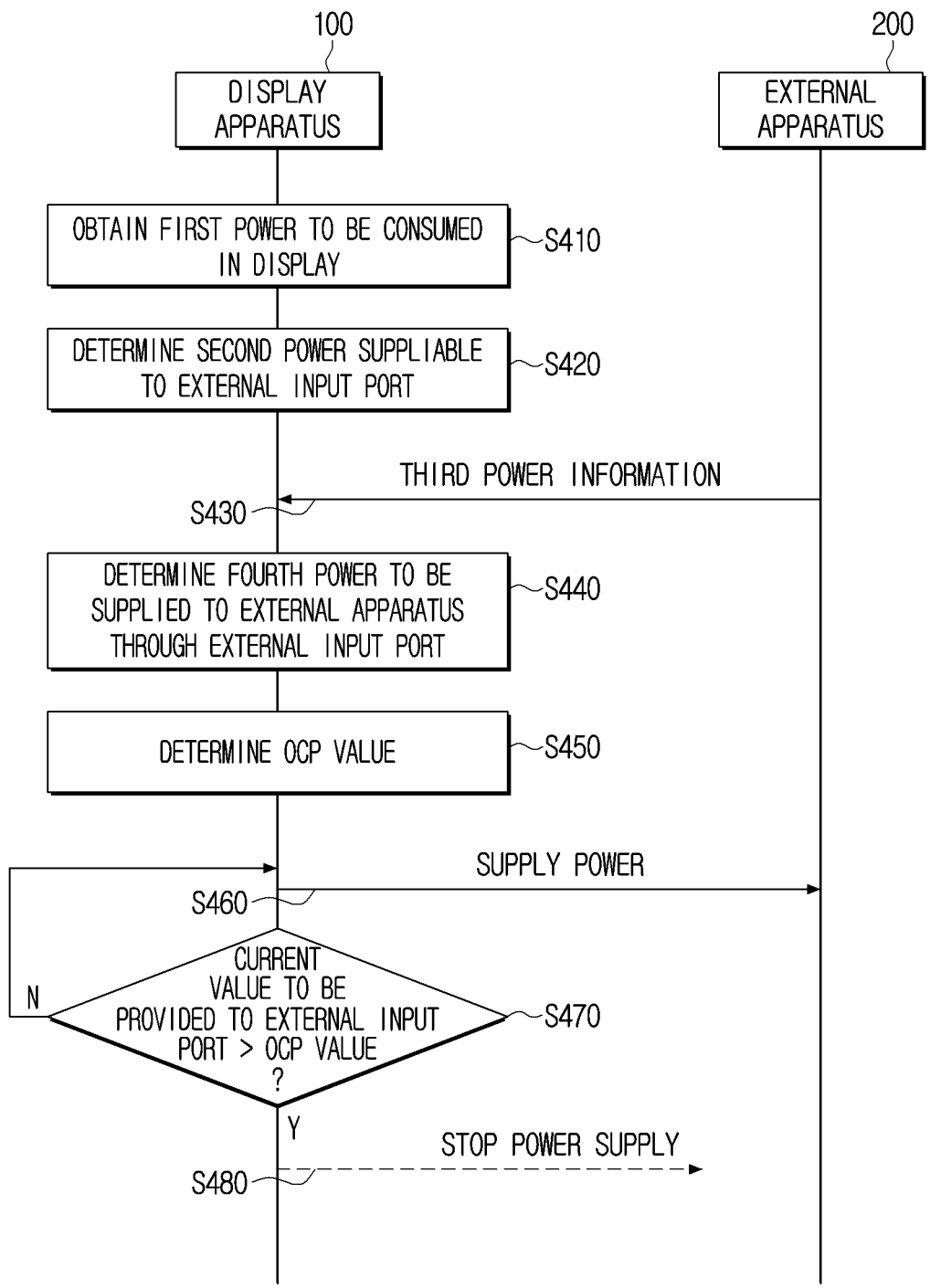
FIG. 4 is a diagram illustrating an operation of a display apparatus supplying power to an external apparatus according to one or more embodiments of the disclosure.

FIG. 4 is a diagram illustrating an operation of a display apparatus supplying power to an external apparatus according to one or more embodiments of the disclosure.

Referring to FIG. 4, the display apparatus 100 may obtain the first power consumed in the display 130 (S410), and determine the second power suppliable to the external input port 120 based on the first power (S420). Detailed descriptions associated therewith will be provided below in FIG. 5.

Then, the display apparatus 100 may receive the third power information demanded for supplying power to the external apparatus 200 connected to the external input port 120 from the external apparatus 200 (S430), and determine the fourth power to be provided to the external input port 120 based on the second power and third power information (S440). Detailed descriptions associated therewith will be described below in FIG. 6 to FIG. 8.

Further, the display apparatus 100 may determine the over current protection (OCP) value based on the fourth power (S450), supply the determined fourth power, via the external input port, to the external apparatus (S460), and stop power supply to the external apparatus 200 (S480) if the current value supplied to the external input port 120 exceeds the OCP value (S470). Detailed descriptions associated therewith will be described below in FIG. 9.

Figure 5:
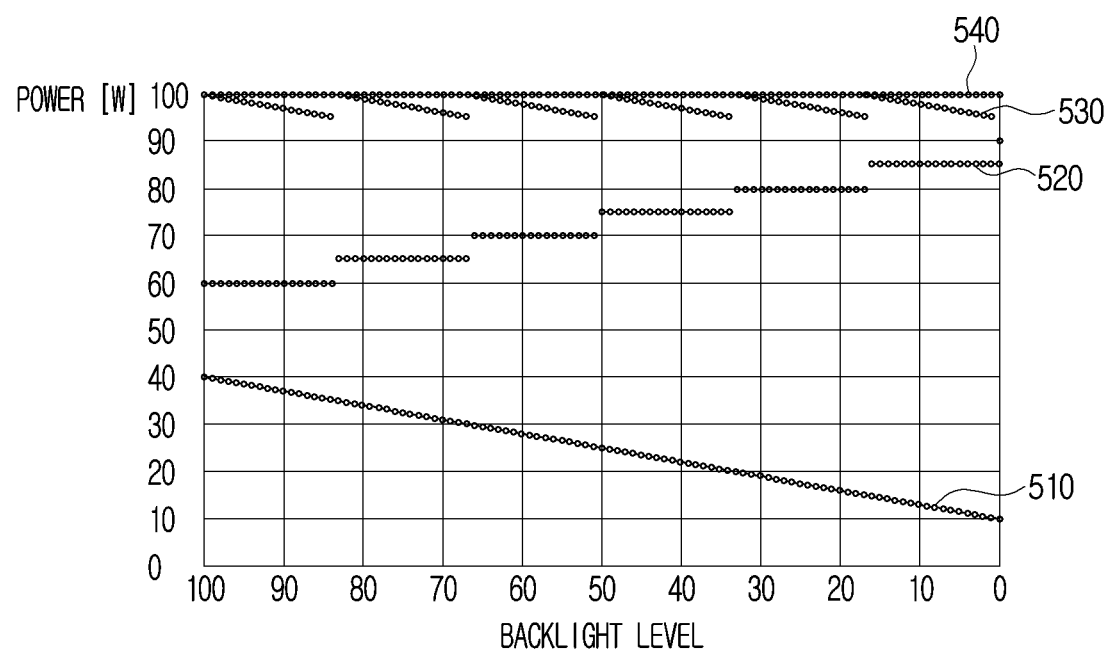
FIG. 5 is a diagram illustrating an operation of calculating power supplied from a display apparatus to an external apparatus according to one or more embodiments of the disclosure.

FIG. 5 is a diagram illustrating an operation of calculating power supplied from a display apparatus to an external apparatus according to one or more embodiments of the disclosure.

The display apparatus 100 may obtain brightness information of the display according to a set backlight level. For example, referring to FIG. 5, a backlight level may include levels zero to one hundred, and power consumption of the display 130 based therefrom may be a maximum of 40 W, and a minimum of 10 W.

Here, the processor 140 may receive the third power information required from the external apparatus 200 with a USB power delivery (USB-PD) power data objects (PDO) method.

The USB-PD may have a power supply standard for charging electronic apparatuses using a USB terminal, and is characterized by power supply being possible to a maximum of 100 W through a USB cable.

The display apparatus 100 and the external apparatus 200 may determine how to set a voltage value and a current value when charging between the electronic apparatuses connected through USB terminals prior to power supply through the USB-PD.

In this process, the PDO method may be used, and the PDO may be a method of determining the power supply voltage value and the current value by exchanging specification information (hereinafter, power supply specification information) of the voltage value and the current value used in power supply between the electronic apparatuses connected through the USB cable.

If a maximum output of SMPS is 100 W, the second power which can be provided to the external input port 120 may be, for example, a maximum of 90 W and a minimum of 60 W. The display apparatus 100 may determine the second power from among a plurality of power values according to a USB-PD setting. For example, referring to FIG. 5, the USB-PD setting may be divided into 7 levels, and a second power value may be determined from among 60 W, 65 W, 70 W, 80 W, 85 W, and 90 W.

Figure 6:
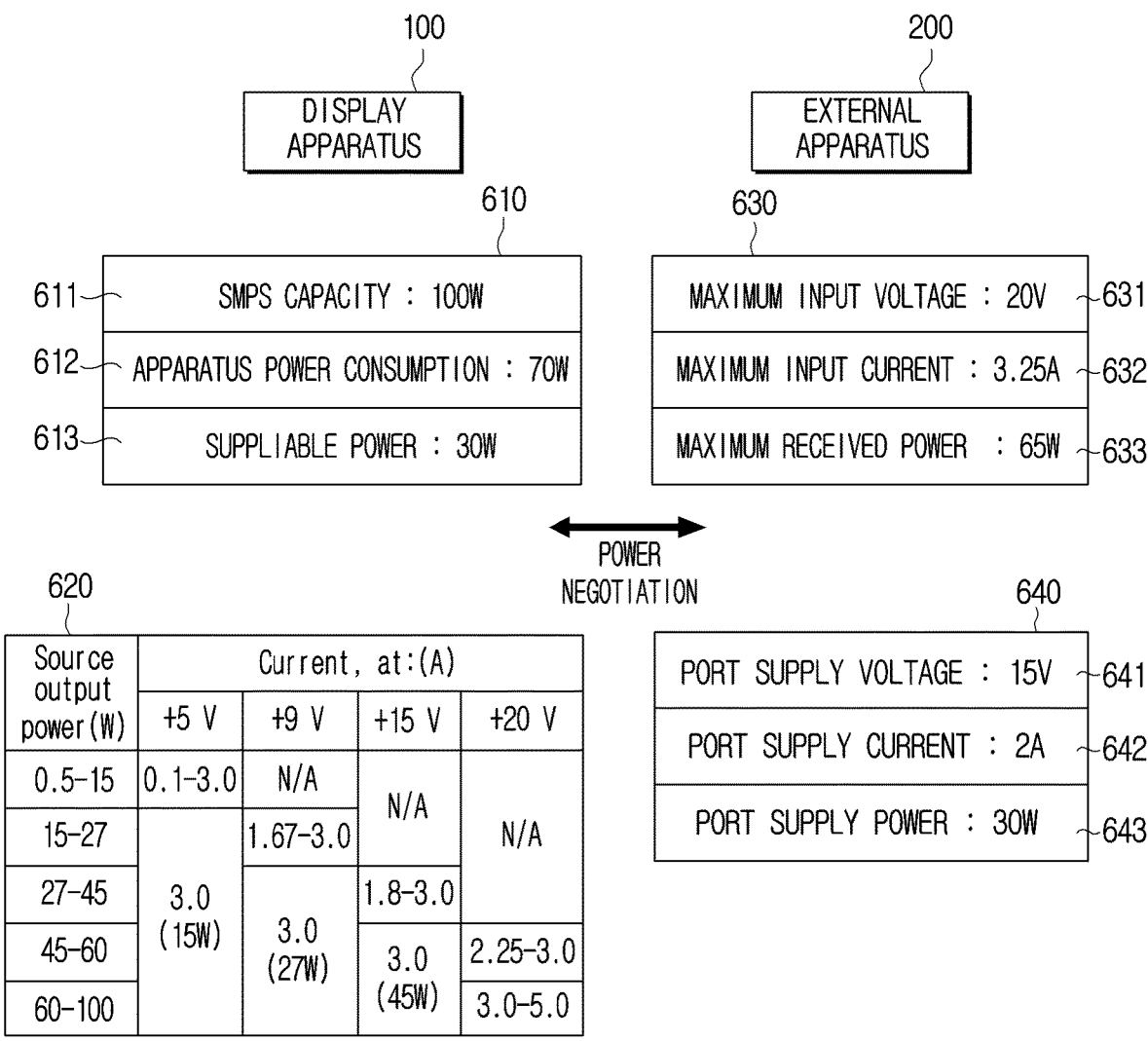
FIG. 6 is a diagram illustrating an operation of determining power to be supplied to an external apparatus through communication between a display apparatus and the external apparatus.
Figure 7:
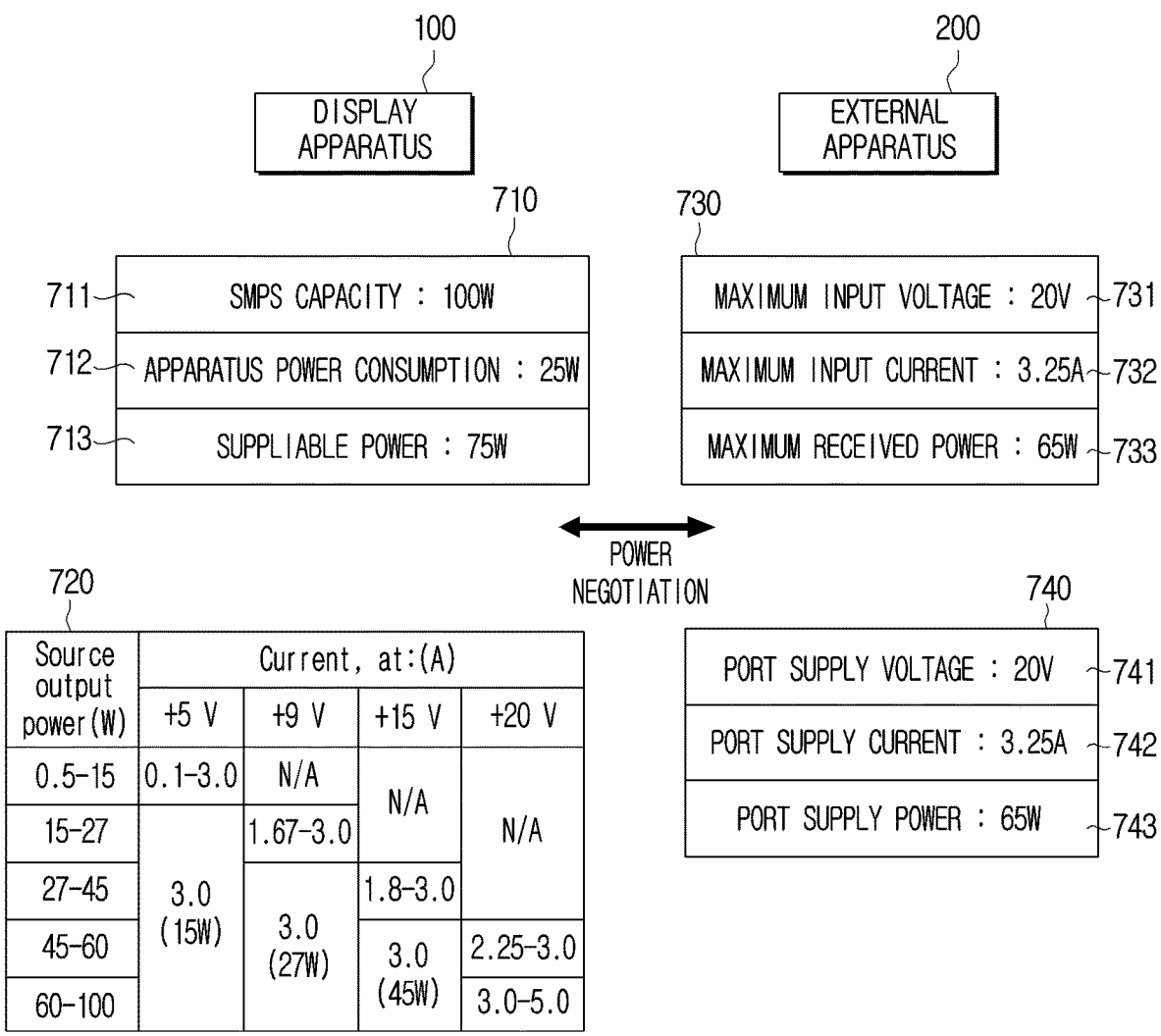
FIG. 7 is a diagram illustrating an operation of determining power to be supplied to the external apparatus if power consumption of the display apparatus is reduced in FIG. 6.

FIG. 6 is a diagram illustrating an operation of determining power to be supplied to an external apparatus through communication between a display apparatus and the external apparatus, and FIG. 7 is a diagram illustrating an operation of determining power to be supplied to the external apparatus if power consumption of the display apparatus is reduced in FIG. 6.

A left upper end table 610 in FIG. 6 may show a supply and consumption of power of the display apparatus 100. The display apparatus 100 may supply 30 W 613 to the external apparatus 200 through the external input port 120 due to SMPS capacity of the power supply device 110 being 100 W 611 and apparatus power consumption being 70 W 612.

A left lower end table 620 in FIG. 6 may be associated with power supply specification information of the display apparatus 100 according to one or more embodiments of the disclosure.

The power supply specification information may be specification information according to the PDO method. According to the PDO method, the display apparatus 100 may supply power to the external apparatus 200 with only a pre-set voltage.

Referring to the table 620, the display apparatus 100 may supply a current of 0.1 A to 3.0 A with a voltage of 5V to the external apparatus 200, supply a current of 1.67 A to 3.0 A with a voltage of 9V, supply a current of 1.8 A to 3.0 A with a voltage of 15V, and supply a current of 2.25 A to 5 A with a voltage of 20V.

A right upper end table 630 in FIG. 6 may be associated with a maximum input voltage, a maximum input current, and a maximum received power of the external apparatus 200.

The external apparatus 200 may have the maximum input voltage of 20V 631, the maximum input current of 3.25 A 632, and the maximum received power of 65 W 633.

The display apparatus 100 and the external apparatus 200 may exchange information of each apparatus shown in tables 610, 620, and 630 described above through a wired communication prior to carrying out power supply. Because the maximum received power 633 of the external apparatus 200 exceeds a suppliable power of the display apparatus 100, the display apparatus 100 may supply 30 W which is a suppliable power 613 of the display apparatus 100 to the external apparatus 200.

When display apparatus 100 and the external apparatus 200 may carry out power supply in the PDO method, because power supply may be carried out with only the fixed voltage, 15V may be determined as the voltage supplied from the external input port 120 according to the power supply specification 620 of the display apparatus 100 641.

Referring to the table 620 on the power supply specification information, if an output voltage is 15V, the display apparatus 100 may supply a current of 1.8 A to 3.0 A, and because the suppliable power of the display apparatus 100 is 30 W, the current supplied to the external input port 120 is determined as 2.0 A 642.

Accordingly, a port supply power may be determined as 30 W 643. In FIG. 6, a determining process of the above-described port supply power has been described with a term 'power negotiation.'

FIG. 7 shows the power consumption of the display apparatus 100 in FIG. 6 having been reduced to 25 W and thereby, 75 W may be supplied to the external apparatus 200 through the external input port 120.

In this case, because a maximum received power 733 of the external apparatus 200 does not exceed a suppliable power 713 of the display apparatus 100, the display apparatus 100 may supply 65 W to the external apparatus 200.

Referring to table 720 associated with the power supply specification information, because the output voltage is a maximum of 20V if the supply power is 65 W, and the above did not exceed a maximum input voltage 731 of the external apparatus 200, the 20V may be determined as the voltage supplied to the external input port 120 741. In addition, a port supply current may be determined as 3.25 A 742, and 65 W which is a multiplication of the port supply voltage 741 and the port supply current 742 may be determined as the port supply power 743.

Accordingly, if the power consumption of the display apparatus 100 becomes smaller, a greater power may be supplied to the external apparatus 200, and an efficient charging operation may be possible.

Figure 8:
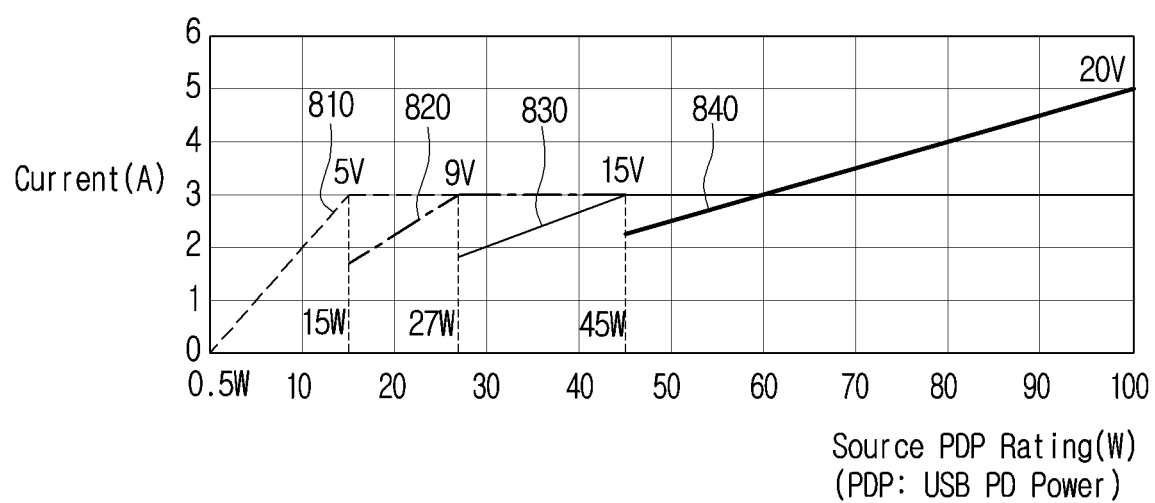
FIG. 8 is a graph of a voltage value and a current value corresponding to a supply power according to one or more embodiments of the disclosure.

FIG. 8 is a graph of a voltage value and a current value corresponding to a supply power according to one or more embodiments of the disclosure.

In FIG. 8, voltage and current values are shown assuming that power supply is carried out in the above-described PDO method, and may be a graph that represents tables 620 and 720 associated with the power supply specification information of FIG. 6 and FIG. 7.

A graph shown at a far left side 410 in FIG. 8 shows power supply being possible up to a maximum of 15 W according to a current value of when power supply is carried out with an output voltage of 5V having a value of 0.1 A to 3.0 A.

A graph shown second from the left side 420 shows that power supply is possible up to a maximum of 27 W according to a current value of when power supply is carried out with an output voltage of 9V having a value of 1.67 A to 3 A.

A graph shown third from the left side 430 shows that power supply is possible up to a maximum of 45 W according to a current value of when power supply is carried out with an output voltage of 15V having a value of 1.8 A to 3 A.

A graph shown at a far right side 440 shows power supply being possible up to a maximum of 100 W according to a current value of when power supply is carried out with an output voltage of 20V having a value of 2.25 A to 5 A.

FIG. 9 is a diagram illustrating an operation of determining an OCP value according to power supplied from a display apparatus to an external device according to one or more embodiments of the disclosure The display apparatus 100 may determine the OCP value based on the supply power (i.e., fourth power) to the external apparatus determined according to the above-described USB-PD method.

In this case, the display apparatus 100 may determine the OCP value according to a pre-set ratio from the current value supplied to the external input port 120 according to the fourth power. For example, a value with 20% of the current value supplied to the external input port as a margin, that is, 1.2 times of a supply current value may be determined as the OCP value.

If power calculated based on the OCP value and a voltage value according to the fourth power, that is a power consumption strength which is provided to the external apparatus exceeds the supply power of the power supply device 110, the OCP value may be adjusted to be reduced. Referring to FIG. 9, if the fourth power is 90 W, when a charge current is provided as the OCP value (5.4 A) determined according to a power value (4.5 A) that is supplied, the power consumption strength may be 108 W and may exceed 100 W which is a maximum supply power of SMPS. In this case, the processor 140 may adjust the OCP value such that the power consumption strength becomes less than or equal to 100 W.

The display apparatus 100 may prevent, by stopping power supply to the external apparatus 200 when the current value provided through the external input port 120 exceeds the OCP value, an over current from being supplied to the external apparatus 200.

Figure 10:
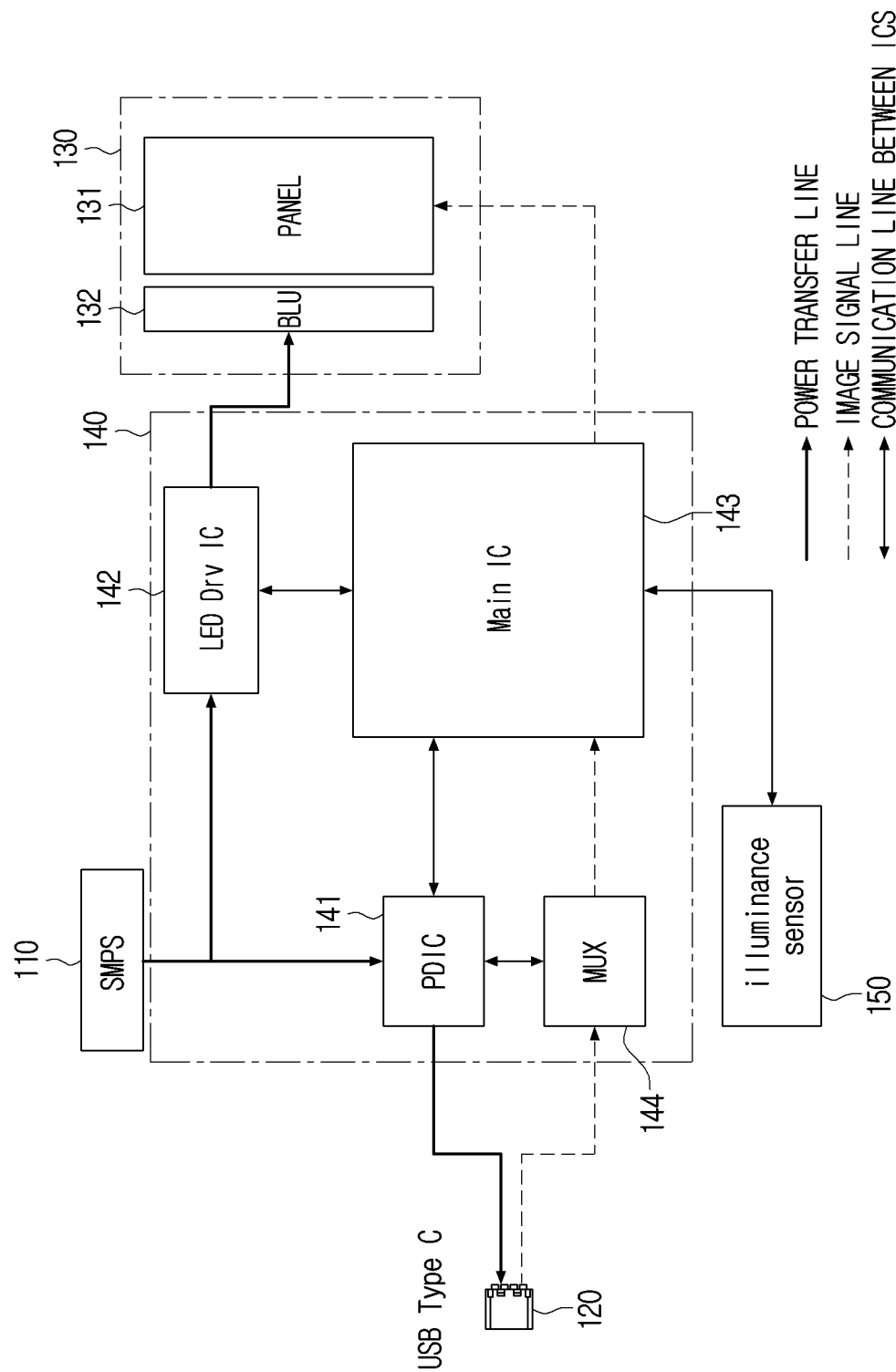
FIG. 10 is a diagram illustrating a configuration of a display apparatus and signal transferring between the configurations according to one or more embodiments of the disclosure.

FIG. 10 is a diagram illustrating a configuration of a display apparatus and signal transferring between the configurations according to one or more embodiments of the disclosure.

FIG. 10 has been described assuming that the external apparatus 200 is connected to the external input port 120.

The display 130 may be an LCD panel, and may be formed of a liquid crystal panel 131 a backlight unit (BLU) 132.

The processor 140 may be formed of a PDIC 141, an LED Driver IC 142, a Main IC 143, and a MUX IC 144.

The power delivery IC (PDIC) 141 may be an IC chip that adjusts power supplied by the SMPS of the power supply device 110 to the external input port 120 and the display 130, respectively. The above may be referred to as a power management IC (PMIC), and may manage such that the display apparatus 100 supplies power necessary to the elements accurately and efficiently.

The PDIC 141 may adjust power being supplied to the external input port 120 which is a USB type-C standard.

The LED Driver IC 142 may provide a driving signal and data as an electric signal (a Multi High Voltage Level Signal) to the display panel 131 for texts or moving images to be displayed in the display 130 as essential key elements in the driving of the display apparatus 100, may be a semiconductor (IC) that provides power to the light emitting diodes (LEDs) provided in the backlight unit 132.

The Main IC 143 may control the overall operation of the display apparatus 100, and include a function of expanding and reducing image data input to the display apparatus 100 and displaying in the display 130.

The MUX IC 144 may transfer the image signal input from the external input port 120 to the Main IC 143.

The illuminance sensor 150 may transfer illuminance information of the surrounding environment to the Main IC 143.

Figure 11:
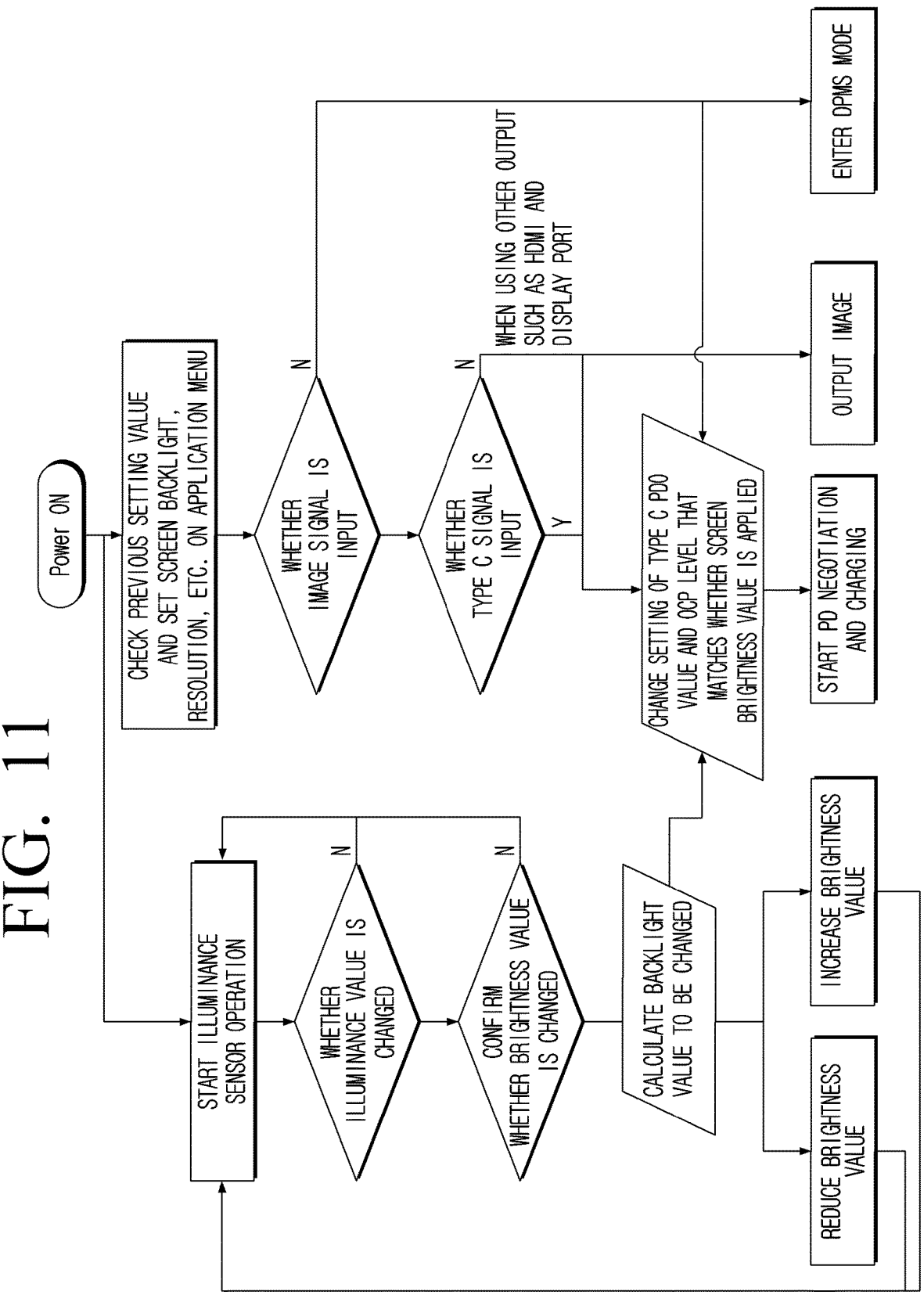
FIG. 11 is a diagram illustrating an operation of automatically adjusting a display brightness through an illuminance sensor provided in a display apparatus according to one or more embodiments of the disclosure.

FIG. 11 is a diagram illustrating an operation of automatically adjusting a display brightness through an illuminance sensor provided in a display apparatus according to one or more embodiments of the disclosure.

If power of the display apparatus 100 is turned-on, supply power (i.e., fourth power) to the external apparatus 200 may be set according to a backlight level value of the display 130.

The illuminance sensor 150 may sense the illuminance surrounding the display apparatus 100, and transmit the sensed illuminance information to the processor 140. The processor 140 may adjust the brightness of the display 130 based on the sensed illuminance, and obtain the adjusted brightness information as brightness information of the display 130.

If a user command for adjusting the brightness of the display 130 is input (for example, a user input through an operation panel), the adjusted brightness information according to the input user command may be obtained as the brightness information of the display 130.

The processor 140 may obtain first power which is consumed in the display 130 based on brightness information of the display 130, and automatically adjust the supply power to the external apparatus 200 based therefrom.

FIG. 12 is a flowchart illustrating a control method of a display apparatus according to one or more embodiments of the disclosure.

Referring to FIG. 12, a control method of the display apparatus may include obtaining first power consumed in the display based on the brightness information of the display (S1210), determining second power suppliable to the external input port based on first power information and supply power of the power supply device (S1220), receiving information about third power required to supply power to an external apparatus connected to the external input port from the external apparatus (S1230), determining fourth power supplied to the external input port based on the second power and information about the third power (S1240), determining the over current protection (OCP) value based on the fourth power (S1250), and stopping power supply to the external apparatus based on the current value supplied through the external input port exceeding the OCP value (S1260).

First, the first power which is consumed in the display may be obtained based on the brightness information of the display (S1210).

Here, illuminance surrounding the display apparatus may be sensed through the illuminance sensor, the brightness of the display may be adjusted based on the sensed illuminance, and the adjusted brightness information may be obtained as the brightness information of the display.

When the user command for adjusting the brightness of the display is input, the brightness information adjusted according to the input user command may be obtained as the brightness information of the display.

Then, the second power suppliable to the external input port may be determined based on the first power information and the supply power of the power supply device (S1220).

Here, the external input port may have the USB Type-C standard. The display apparatus may receive an image signal from the external input port, and display an image based on the received image signal through the display.

Then, information about the third power required to supply power to the external apparatus connected to the external input port may be received from the external apparatus (S1230).

In this case, the third power information may be received with the USB Power Delivery (USB-PD) power data objects (PDO) method.

Here, the third power information may be information about the voltage value and the current value required for the charging the external apparatus.

Then, the fourth power supplied to the external input port may be determined based on the second power and information about the third power (S1240).

In this case, if a required power of the external apparatus calculated based on the voltage value and the current value included in the third power information does not exceed the second power, the fourth power may be determined based on the voltage value and the current value included in the third power information.

If the required power of the external apparatus calculated based on the voltage value and the current value included in the third power information exceeds the second power, the fourth power may be determined with a pre-set voltage value and current value within a range that does not exceed the second power.

Then, the over current protection (OCP) value may be determined based on the fourth power (S1250).

In this case, the OCP value may be determined according to a pre-set ratio from the current value supplied to the external input port according to the fourth power. For example, a value with a 20% margin of the current value supplied to the external input port, that is, 1.2 times of the supply current value may be determined as the OCP value.

Based on the power calculated based on the OCP value and the voltage value according to the fourth power, that is, the power consumption strength supplied to the external apparatus exceeding the supply power of the power supply device, the OCP value may be adjusted to be reduced.

Then, based on the current value supplied through the external input port exceeding the OCP value, power supply to the external apparatus may be stopped (S1260).

While the disclosed embodiments have been shown and described above with reference to example embodiments thereof, the disclosed embodiments is not limited to the above-described specific embodiments and various modifications may be made therein by those skilled in the art to which the disclosed embodiments pertain without departing from the true spirit and full scope of the disclosed embodiments, and such modifications shall not be understood as separate from the technical spirit or outlook of the disclosed embodiments.

What is claimed is:

1. A display apparatus, comprising:
   an external input port which is connectable with an external apparatus, the external input port being configured to supply power to the external apparatus;
   a power supply configured to (i) generate direct current power corresponding to a power consumption of the external apparatus when using power received from an external source, and (ii) provide the generated direct current power to the external input port;
   a display;
   a communication interface;
   at least one memory; and
   at least one processor connected to the external input port, the power supply, the display, the communication interface, and the at least one memory;
   wherein the at least one memory includes programs, where the at least one memory and the programs are configured, with the at least one processor, to cause the apparatus to at least:
      obtain, from the display, first power consumed in the display based on brightness information of the display,
      determine second power suppliable to the external input port based on the first power consumed,
      receive information, via the external input port from an external apparatus connected to the external input port, about third power supplying to the external apparatus,
      determine fourth power supplied to the external input port, based on the second power and the information about the third power,
      determine an over current protection (OCP) value based on the fourth power,
      supply the determined fourth power, via the external input port, to the external apparatus, and
      stop power supplied, via the external input port, to the external apparatus based on a determination that a current value, which is supplied to the external input port, exceeds the OCP value,
   wherein the at least one processor is further configured to determine the OCP value according to a pre-set ratio from the current value supplied to the external input port according to the fourth power, and
   wherein the pre-set ratio corresponds to an OCP margin, the OCP value is obtained by applying the pre-set ratio to the current value, and the OCP value is higher than the current value.

2. The display apparatus of claim 1, wherein the at least one processor is further configured to adjust, based on power calculated based on the OCP value and a voltage value according to the fourth power exceeding supply power of the power supply, the OCP value to be reduced.

3. The display apparatus of claim 1, wherein the at least one processor is further configured to receive the information about the third power with a USB Power Delivery (USB-PD) Power Data Objects (PDO) method.

4. The display apparatus of claim 1,
   wherein the information about the third power is information about a voltage value and a current value required to charge the external apparatus, and
   wherein the at least one processor is further configured to determine, based on the supplied power of the external apparatus calculated based on the voltage value and the current value corresponding to the information about the third power not exceeding the second power, the fourth power based on the voltage value and the current value corresponding to the information about the third power.

5. The display apparatus of claim 1,
   wherein the information about the third power is information about a voltage value and a current value required to charge the external apparatus, and wherein the at least one processor is further configured to determine, based on the supplied power of the external apparatus calculated based on the voltage value and the current value corresponding to the information about the third power exceeding the second power, the fourth power with a pre-set voltage value and current value within a range not exceeding the second power.

6. The display apparatus of claim 1, further comprising: an illuminance sensor,
wherein the at least one processor is further configured to receive a sensed illuminance surrounding the display apparatus from the illuminance sensor,
adjust brightness of the display based on the sensed illuminance, and
obtain the adjusted brightness information as brightness information of the display.

7. The display apparatus of claim 1, wherein the at least one processor is further configured to obtain, based on a user command for adjusting brightness of the display being input, the adjusted brightness information as brightness information of the display.

8. The display apparatus of claim 1, wherein the external input port is a USB Type-C standard.

9. The display apparatus of claim 1, wherein the at least one processor is further configured to:
receive an image signal from the external input port, and
control the display to display an image based on the received image signal.

10. A method of a display apparatus, the method comprising:
obtaining first power consumed in a display based on brightness information of the display;
determining second power suppliable to an external input port based on the first power consumed;
receiving, via the external input port, from an external apparatus connected to the external input port, information about third power that is supplied to the external apparatus;
determining fourth power supplied to the external input port, based on the second power and the information about the third power;
determining an over current protection (OCP) value based on the fourth power;
supplying the determined fourth power, via the external input port, to the external apparatus;
stopping power supplied, via the external input port, to the external apparatus based on a determination that a current value, which is supplied through the external input port, exceeds the OCP value; and
determine the OCP value according to a pre-set ratio from the current value supplied to the external input port according to the fourth power,
wherein the pre-set ratio corresponds to an OCP margin, the OCP value is obtained by applying the pre-set ratio to the current value, and the OCP value is higher than the current value.

11. The method of claim 10, further comprising: adjusting, based on power calculated based on the OCP value and a voltage value according to the fourth power exceeding supply power of the power supply, the OCP value to be reduced.

12. The method of claim 10, wherein the receiving information about the third power comprises receiving the information about the third power with a USB Power Delivery (USB-PD) Power Data Objects (PDO) method.

13. The method of claim 10,
wherein the information about the third power is information about a voltage value and a current value required to charge the external apparatus, and
wherein the determining the fourth power comprises determining, based on the supplied power of the external apparatus calculated based on the voltage value and the current value corresponding to the information about the third power not exceeding the second power, the fourth power based on the voltage value and the current value corresponding to the information about the third power.

14. The method of claim 10,
wherein the information about the third power is information about a voltage value and a current value required to charge the external apparatus, and
wherein the determining the fourth power comprises determining, based on the supplied power of the external apparatus calculated based on the voltage value and the current value corresponding to the information about the third power exceeding the second power, the fourth power with a pre-set voltage value and current value within a range not exceeding the second power.

15. The method of claim 10, further comprising:
receiving a sensed illuminance surrounding the display apparatus from the illuminance sensor,
adjusting brightness of the display based on the sensed illuminance, and
obtaining the adjusted brightness information as brightness information of the display.

16. The method of claim 10, further comprising: obtaining, based on a user command for adjusting brightness of the display being input, the adjusted brightness information as brightness information of the display.

17. The method of claim 10, further comprising:
receiving an image signal from the external input port, and
controlling the display to display an image based on the received image signal.

18. A non-transitory computer readable medium storing instructions that when executed by at least one processor directs the at least one processor to perform a control method of a display apparatus, the control method including:
obtaining first power consumed in a display based on brightness information of the display;
determining second power suppliable to an external input port, based on the first power consumed;
receiving information, via the external input port from an external apparatus connected to the external input port, about third power supplying to the external apparatus;
determining fourth power supplied to the external input port based on the second power and information about the third power;
determining an over current protection (OCP) value based on the fourth power;
supplying the determined fourth power, via the external input port, to the external apparatus;
stopping power supplied, via the external input port, to the external apparatus based on a determination that a current value, which is supplied through the external input port, exceeds the OCP value; and
determining the OCP value according to a pre-set ratio from the current value supplied to the external input port according to the fourth power,
wherein the pre-set ratio corresponds to an OCP margin, the OCP value is obtained by applying the pre-set ratio to the current value, and the OCP value is higher than the current value.

* * * * *